United States Patent Office 2,783,646
Patented Mar. 5, 1957

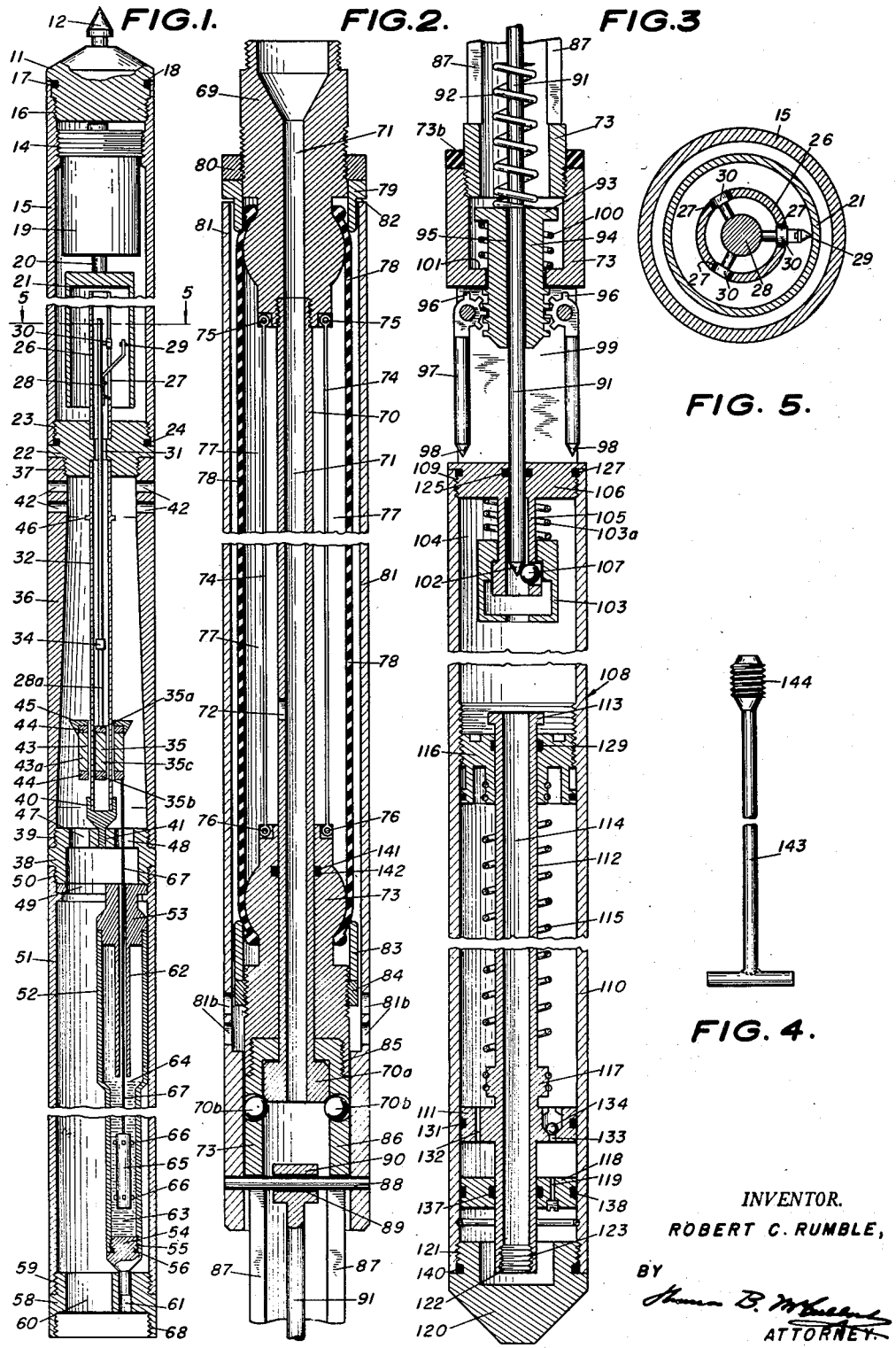
March 5, 1957
R. C. RUMBLE
2,783,646
FLOWMETER FOR WELLS
Filed Dec. 9, 1954
INVENTOR.
ROBERT C. RUMBLE,
BY
ATTORNEY

2,783,646

FLOWMETER FOR WELLS

Robert C. Rumble, Houston, Tex., assignor, by mesne assignments, to Esso Research and Engineering Company, a corporation of Delaware Application December 9, 1954, Serial No. 474,059

2 Claims. (Cl. 73—155)

The present invention is directed to a fluid metering apparatus adapted to be used in wells. More particularly, the invention is directed to a well flow meter suitable for use in injection wells. In its more specific aspects, the invention is concerned with a well flow meter for flowing fluids into a borehole, such as water and the like.

The present invention may be described as a well flow meter which comprises an elongated body member adapted to be arranged in a well. The body member is provided with an internal metering chamber having an upward taper. The chamber is provided with an inlet and outlet for flow of fluids downwardly through the chamber. Arranged in the chamber is a guided float member which has means attached to it urging the float member against the direction of flow through the chamber. Means responsive to the float member are provided for indicating fluid flow through the chamber.

In the present invention a buoyant force is transmitted to the float and applies an essentially constant force to the float against the direction of flow through the chamber. This buoyant force is provided by arranging in the elongated body member a float member, such as a plastic cylinder immersed or submerged in a column or body of mercury. The force of the submerged float is transmitted to a float member such as an inverted rotameter float by means of a thin interconnecting rod linkage. The effect of the plastic float is to exert a substantially constant upward buoyant force against the float in a direction opposite to normal fluid flow through the chamber.

A permanent magnet is incorporated into the rotameter float which is free to move vertically on a hollow tube of non-magnetic metal. Inside the tube a thin cylindrical follower-magnet aligns itself with the position of the driver magnet incorporated in the rotameter float. The follower magnet is attached by a thin rod to a stylus which makes a continuous record of the float height on a constant speed revolving chart. This arrangement obviates the need for a high pressure packing gland between float and recording stylus.

Arranged below the metering float in the barrel of the instrument is a smaller cylinder which houses the mercury column and the immersed plastic float. The upper end of this cylinder which is spaced off center in the instrument barrel by means of spiders is fitted with a hollow cap so designed that even though the whole instrument be inverted no mercury will spill through the hole in the cap.

The upper end of the instrument is provided with a fishing spear and the like for attachment to a wire line for locating the instrument in a well. The lower end of the instrument is provided with internal threads to engage directly to a packer such as one described in application Serial Number 398,721 filed in the names of Robert C. Rumble and Beldon A. Peters.

The present invention will be further illustrated by refreence to the drawing in which:

Fig. 1 is a sectional view of the flowmeter apart from the packing means;

Fig. 2 illustrates the packer portion of the device in section;

Fig. 3 is a sectional view of the lower portion of the apparatus;

Fig. 4 illustrates a device for setting the instrument prior to operation of same; and Fig. 5 is a sectional view taken along the line 5—5 of Fig. 1.

The invention will be further illustrated by reference to the drawing in which Fig. 1 is a sectional view of the device of the present invention. With reference to the drawing, numeral 11 designates a head member provided on its upper end with a fishing spear 12. The fishing spear is adapted to be engaged by engaging means attached to a wire line, not shown, for suspending the device from the wellhead of a well.

The lower end of member 11 engages the upper end of barrel or mandrel 15 by means of threads 16 and a pressure seal between the members 11 and 15 is effected by means of O-ring 17 lying in groove 18. Inside of barrel 15 is mounted a clock 19 secured thereto by means of threads 14. To clock 19 is connected by means of a short shaft 20 a chart case 21 which rotates at a constant speed driven by clock 19.

The lower end of barrel 15 engages the upper end of wall member 22 by means of threads 23 and a pressure seal at this joint is afforded by O-ring 24. Projecting upward from the upper end of wall member 22 is a cylindrical guide member 26 in which are cut three longitudinal slits 27 at 120° intervals around the guide member. Free to move longitudinally inside the guide member 26 is a thin rod 28 equipped with stylus 29 projecting through one of the slits. Rod 28 is centered in guide member 26 by means of three attached sets of bearings 30 riding in the slits 27. Rod member 28 extends downward through hole 31 in wall member 22 and into hollow float guide member 32, the upper end of which is mounted in wall member 22 by means of a silver solder joint. The lower end of rod 28 is connected to universal joint 34 which in turn is connected to the upper end of stub rod 28a.

The lower end of stub rod 28a is attached to follower magnet 35 consisting of soft iron pole pieces 35a and 35b press fitted on the ends of a cylindrical Alnico V magnet 35c. The follower magnet 35 is free to move vertically inside of float guide 32.

Float guide 32 is centrally disposed in rotameter chamber 36 which is attached on its upper end to wall member 22 by means of threads 37 and on its lower end to the upper end of spider wall member 38 by means of threads 39. The lower end of float guide 32 is silver soldered into cap member 40 the lower end of which rests in centralizing hole 41 in spider wall member 38.

Equally spaced around the upper portion of rotameter chamber 36 are fluid entry ports 42. The inside of the rotameter chamber 36 is shaped like an inverted cone. In this chamber the rotameter float 43 mounted on float guide 32 is free to move up and down between the stop 46 and the cap member 40. Float member 43 consists of an assembly of soft iron pole pieces 44 and a non-magnetic metering element 45 assembled about the cylindrical permanent magnet 43a.

Spider wall member 38 is provided with fluid ports 47 and 48. Attached to the lower end of spider wall member 38 by means of threads 50 is body member 51. Member 51 houses a mercury float chamber 52 disposed off-center in member 51 by means of spider cap member 53 on its upper end. The lower end of mercury chamber 52 is fitted to a cap member 54 by means of threads 55 and a pressure seal is maintained by O-ring 56. The lower end of body member 51 is attached to a second spider member 58 by means of threads 59. Spider member 58 is provided with fluid passage port 60 and hole 61 which serves to support and align cap member 54. Upper cap member 53 of mercury chamber 52 is provided with a fluid port 49 and a hollow tubular extension 62 extending down into the enlarged section of chamber 52. Chamber 52 is filled with mercury 63 to a level 64 when the instrument stands upright. The tubular extension 62 of cap member 53 is of such length that mercury will not spill from chamber 52 even though it be tilted or inverted.

Immersed in mercury 63 is a plastic float 65 provided with centralizing protuberances 66. A thin rod 67 is attached to the bottom rim of rotameter float 43 and extends down through port 48 in wall member 38, thence downward through the hole in cap member 53 and down through mercury 63 to engage the upper end of float 65. The buoyant force imparted to rod 67 by float 65 is in excess of that required to raise metering float 43 into contact with stop 46 on float guide member 32. In this position mercury float member 65 remains totally immersed in the mercury.

Connected by mating threads 68 is a mandrel 69 which has a section 70 of reduced size attached to the mandrel 69 and the reduced section 70 and the mandrel 69 has a central or longitudinal passageway 71 which is provided with a port 72 which communicates the central passageway 71 with an exterior surface of the mandrel 69. The mandrel 69 is slidably attached to the upper end of a body member 73. A cushion 73b suitably constructed of a deformable material such as natural or synthetic rubber is provided on the body member 73. The mandrel 69 is provided with a plurality of horizontally spaced apart spring members 74 which are arranged around the reduced section 70. The spring members 74 are hingedly attached to the mandrel 69 by hinges 75 and to the upper end of the body member 73 by hinges 76. Enclosing a space 77 and the spring members 74 is a deformable packing member 78 which is suitably constructed of either synthetic or natural rubber or a plastic deformable material. The deformable packing member is connected to the mandrel 69 by means of a slidable ring 79 and a lock ring 80 arranged above the port 72 on the mandrel 69.

Completely surrounding and enclosing the deformable member 78 is a slidable sleeve 81 provided with ports 81b and which seats against a shoulder 82 of the slidable ring 79.

The lower end of the deformable packing member 78 is held against the upper end of the body member 73 by a slidable ring or sleeve 83 and a lock ring 84.

The lower end of the reduced section 70 of the mandrel 69 is embraced by the upper portion of the body member 73 which is threadably engaged by mating threads 85 with a slotted section 86 of the body member 73 provided with oppositely opposed longitudinal slots 87 for movement of pin 88 in the slots 87. The pin 88 is arranged in a passageway 89 on the upper end 90 of a slidable rod member 91. This rod member 91 holds the slidable sleeve 81 against relative movement with respect to body member 73 to enclose the deformable packing member 78. Surrounding the rod member 91 is a biasing means 92, such as a helical coil spring, the lower end of which rests against a shoulder 93 of a rack member 94 provided with a passageway 95 into which the rod member 91 is slidably arranged. The rack member 94 is in operative relationship with the teeth 96 of at least a latching dog 97 having a pointed end 98 for engagement with the wall of a well. A plurality of latching dogs or engaging means which may be three in number is provided on the well packer. These latching dogs 97 are arranged in a recess 99 of the body member 73. Mandrel 70 is held in the up position by means of its enlarged lower end 70a engaging spherical balls 70b which are pressed inwardly by the enlarged lower end of outer sleeve 81.

Surrounding the upper end of the rack member 94 is a biasing means 100, such as a helical coil spring, one end of which bears against the shoulder 93 and the other end of which bears against an internal shoulder 101 in the body member 73.

A free end 102 of the rod member 91 is arranged in a cage 103 in a chamber 104 of the body member 73. The cage is slidably arranged on a sleeve 105 which is connected to a wall member 106 which separates the recess 99 from the chamber 104. The cage 103 is biased downwardly by a weak spring 103a arranged between cage 103 and the wall member 106. Arranged in the cage 103 is a spherical member 107 which bears the weight of the rod member 91 and prevents the rod member 91 from moving downwardly with respect to the body member 73.

In the lower end of the body member 73 is provided a dash pot assembly generally indicated by numeral 108 which is threadably connected by mating threads 109 to the body member 73. This dash pot assembly 108 is provided with a piston cylinder 110 in which is arranged a piston 111 connected to an elongated member 112 which has an engaging means 113 on one end thereof protruding into chamber 104 in operative relationship with the cage 103. The elongated member 112 has a passageway 114 for receiving the rod member 91 when the latter moves downwardly with respect to the body member 73.

The elongated member 112 is surrounded or embraced by a biasing means 115, one end of which is attached to a wall member 116 between the chamber 104 and the piston cylinder 110 and the other end of which is attached to the upper end 117 of the piston 111.

The piston cylinder 110 is provided with a floating member 118 which is slidably arranged on the elongated member 112. This floating member 118 is provided with a passageway 119 for filling the dashpot chamber with the proper hydraulic fluid. Floating member 118 allows for temperature expansion of this fluid.

The lower end of the dash pot assembly 108 is closed by a plug 120 threadably connected by mating threads 121 with the dash pot assembly 108. The plug 120 encloses the end 122 of the elongated member 112 which is provided on its inner surfaces with an engaging means or threads 23 for engaging with a setting tool which will be described further.

The wall member 106 is provided with a sealing member, such as an O-ring 125, to seal the rod member 91 on passage through the wall member 106 and to prevent ingress of well fluids into the chamber 104. Likewise, adjacent the mating threads 109 in the wall member 106 is arranged a sealing member, such as O-ring 127, to allow a positive seal.

The wall member 116 is also provided with a sealing member, such as an O-ring 129, to prevent leakage as the elongated member 112 moves through the wall member 116.

The piston 111 is provided with an O-ring 131. The piston 111 is also provided with a passageway 132 for fluids and a passageway 133 including a ball check valve 134 to control fluid flow therethrough.

The floating member 118 is also provided with sealing members 137 and 138, such as O-rings.

The plug 120 is also sealed against leakage adjacent the mating threads 121 by providing a sealing member, such as an O-ring 140.

The upper end of body member 73 is provided with a recess 141 in which is arranged a sealing member 142, such as an O-ring, to seal section 70 and the body member 73 against fluid leakage from space 77.

Referring now to Fig. 4, numeral 143 designates a setting wrench provided with threads or surfaces 144 for engagement with the engaging means, threads, or surfaces 123 of the end 122 of the elongated member 112.

The device of the present invention operates in the following manner:

In practice, the well flowmeter of the present invention with a packer assembly, as has been described, will be lowered in a well to a desired depth on a wire line, not shown, and attached to the fishing spear 12 with the device being held in tension by the wire line.

Prior to lowering the device in the well, the releasing means is set by unscrewing the plug 120 and engaging the threads 123 with the threads 144 of the wrench 143 and pulling the elongated member 112 downward with respect to the body member 73 to its lowest position. This causes a hydraulic fluid, such as a silicone fluid and the like, having a viscosity of about 45,000 SSU at 100° F. to flow through the passageways 132 and 133 of the piston 111 into the upper portion of the piston cylinder 110. This will set the instrument to release the dogs 97 and to pull the sleeve from around the deformable member 78 at a predetermined time which can be determined for the depth in a well in which the instrument is to be lowered by making the port 132 of the proper diameter. As the instrument or tool is lowered into the well, the member 112 gradually and slowly travels upwardly until it engages the cage 103 when the predetermined time interval has transpired. In the operation of the instrument one makes sure that he can lower the instrument to the desired depth and have some time to spare before this predetermined time interval will have transpired. As the cage 103 is contacted by the engaging means 113, the cage is moved upwardly with respect to the sleeve 105 which allows the spherical member 107 to move outwardly in the cage 103 and free the end 102 of the rod member 91 for relative movement with respect to the body member 73. The rod member then moves downwardly through the passageway 114 pulling the sleeve 81 from around the deformable member 78. The well fluids cause the rod member 91 to be forced downward, the pressure being exerted against the rod member 91. The port 60 allows fluid to enter the passageway 71. After sleeve 81 moves downwardly with respect to the mandrel 69, the spherical members 70b, which are biased outwardly by the end 70a on section 70 are free to move outward because of the larger diameter of sleeve 80 on its upper portion. This movement of the spherical member 70b allows the section 70 of the mandrel 69 to move downwardly with respect to the body member 73 on slacking off of the wire line, not shown, the dogs 97 having moved outward in the recess 99 by movement of the end 90 of the rod member 91 against the biasing means 92 which overcomes the biasing means 100. The lower end of sleeve 81 carried downward by pin 88 in passageway 89 ultimately comes to rest against cushion 73b, which may be constructed of deformable material, such as rubber.

With the latching dogs 97 in engagement with the walls of the well and fluid entering the passageway 71, this fluid is free to flow into the space 77, the springs 74 serving to cause fluid from the well to fill space 77. Meanwhile the mandrel 69 to which the locking ring 80 is attached has moved downwardly with respect to the body member 73 a sufficient distance to bow outward the springs 74. Thus, the space 77 becomes filled with well fluids which flow through port 72 from passageway 71. Thereafter slack is let on the wire line to cause the mandrel 69 to move downwardly as far as it will go to expand the deformable member 78 into engagement with the walls of the well bore, the mandrel 69 and its reduced section 70 having moved downwardly a sufficient amount to close off the port 72 by the body member 73, trapping the well fluids in the space 77 and causing expansion of the deformable packing member into sealing contact with the wall of the well. After the packer assembly has been set at the desired depth, as has been described all downward fluid flow in the well bore is diverted through intake fluid ports 42, thence downward through the instrument and outward through passageway 60, and through passageway 71 and thence through slots 87 and since sleeve 81 is pulled downwardly, finally discharged through port 81b. This flow of fluid downwardly through the chamber 36 forces the float 43 against the buoyant force of plastic float 65 immersed in the mercury column 63 until float 43 assumes a level unique for the rate of flow existent in chamber 36. The magnetic coupling between metering float 43 and follower magnet 35 would cause the latter to align itself to the level of the metering float. Movement of follower magnet 35 produces a similar displacement of stylus 29 which would mark the rotating chart 21 in a manner to indicate the position of the metering float 43 at any time of the running of the clock 19 which drives the chart 21. During the running of the instrument, the pressure on the surface 64 of the mercury column 63 is the same as that existing at the particular level in the well since the surface of the mercury is exposed to well pressure directly. The buoyant force on the plastic float remains substantially constant as long as the instrument remains immersed in a given fluid.

Thus the present invention allows the obtaining of the flow in injection wells and the like which may be used in well stimulating or in returning of fluids to formations which have been exhausted. The invention is quite useful in that it may be run on a wire line through the tubing as desired, the packer set and the flow down the well determined and recorded on the instrument.

After the instrument has been used, it may be released by taking up slack on the wire line, not shown, and raising the mandrels 15 and 69 which causes the dogs 97 to drag along the well bore and to be free to move downwardly in the recess 99 which allows the instrument to be moved up the hole through a pipe or tubing string and the like. The instrument may be reset at successively high levels if desired.

The nature and objects of the present invention having been completely described and illustrated, what I wish to claim as new and useful and to secure by Letters Patent is:

1. A well flowmeter for determination of downward flow in a well which comprises, in combination, an elongated body member adapted to be arranged in a well provided with an internal metering chamber having an upward taper, said chamber having an inlet and outlet for directing fluid downwardly through said chamber, a centrally disposed non-magnetic hollow guide member in said chamber, a magnetic float member having an upper portion with a downwardly tapering side wall slidably mounted on said guide member, a float attached to said magnetic float member by an elongated shaft and submerged in a column of fluid urging said float member against the direction of flow through said chamber, magnetic follower means in said guide member responsive to movement of said magnetic float member and indicating means connected to said magnetic follower means adapted to indicate rate of fluid flow through said chamber.

2. A well flowmeter for determination of downward flow in a well which comprises, in combination, an elongated body member adapted to be arranged in a well provided with an internal metering chamber having an upward taper, said chamber having an inlet and outlet for flow of fluids downwardly through said chamber, a centrally disposed non-magnetic hollow guide member in said chamber, a magnetic float member having an upper portion with a downwardly tapering side wall slidably mounted on said guide member, a float attached to said magnetic float member by an elongated shaft and submerged in a column of fluid urging said float member against the direction of flow through said chamber, magnetic follower means in said guide member responsive to movement of said magnetic float member, indicating means connected to said magnetic follower means adapted to indicate rate of fluid flow through said chamber and a fluid flow inflatable packing member arranged on said elongated body member for directing fluid flow through said chamber.

References Cited in the file of this patent

UNITED STATES PATENTS

| | | |
|---|---|---|
| 784,948 | Kuhnke | Mar. 14, 1905 |
| 2,380,399 | Bowie | July 31, 1945 |
| 2,475,630 | Melas et al. | July 12, 1949 |
| 2,552,552 | Head | May 15, 1951 |
| 2,629,446 | Freling et al. | Feb. 23, 1953 |
| 2,649,711 | Dale | Aug. 25, 1953 |